United States Patent [19]

Schultz

[11] 4,432,254
[45] Feb. 21, 1984

[54] VISCOUS DAMPER HAVING RIGID PLASTIC STRUCTURE

[75] Inventor: John C. Schultz, Buffalo, N.Y.

[73] Assignee: Houdaille Industries, Inc., Ft. Lauderdale, Fla.

[21] Appl. No.: 246,901

[22] Filed: Mar. 23, 1981

[51] Int. Cl.³ .............................................. F16F 15/10
[52] U.S. Cl. ..................................... 74/574; 192/58 B
[58] Field of Search .................. 74/574; 188/290, 379, 188/380; 192/58 B

[56] References Cited

U.S. PATENT DOCUMENTS

| | | | |
|---|---|---|---|
| 2,401,856 | 6/1946 | Brock | 220/305 X |
| 2,824,467 | 2/1958 | O'Connor | 74/574 |
| 3,121,347 | 2/1964 | Rumsey | 74/574 |
| 3,373,633 | 3/1968 | Desmond et al. | 74/574 |

FOREIGN PATENT DOCUMENTS

| | | | |
|---|---|---|---|
| 1422151 | 1/1976 | United Kingdom . | |
| 1454959 | 10/1976 | United Kingdom | 188/290 |
| 1482938 | 8/1977 | United Kingdom . | |
| 1587771 | 4/1981 | United Kingdom . | |
| 2062933A | 5/1981 | United Kingdom . | |
| 2087513A | 5/1982 | United Kingdom . | |

OTHER PUBLICATIONS

Hydraulics Division, Houdaille Industries, Inc., Drawing 312554 entitled "Damper Assembly", dated Sep. 1979.

*Primary Examiner*—Leslie A. Braun
*Attorney, Agent, or Firm*—Hill, Van Santen, Steadman & Simpson

[57] ABSTRACT

A viscous damper which has any one or more of three main features, namely at least one of a rotor and housing being formed from rigid plastic material, a bearing projection on one housing portion extending from the plane of the housing working surface less than shear film spaced relation toward the working surface of the rotor member, and means for closing a filler opening through the housing comprising a sealing disk engaging on a shoulder across the opening and a retainer pressing the disk onto the shoulder and having radial retaining teeth, retainingly engaging a wall about the opening.

9 Claims, 4 Drawing Figures

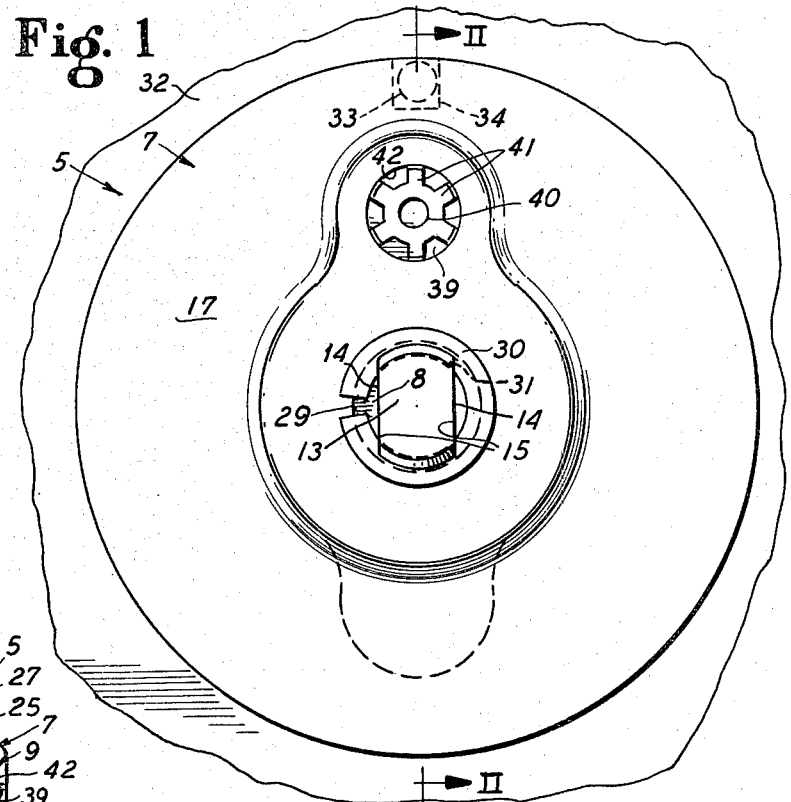
Fig. 1
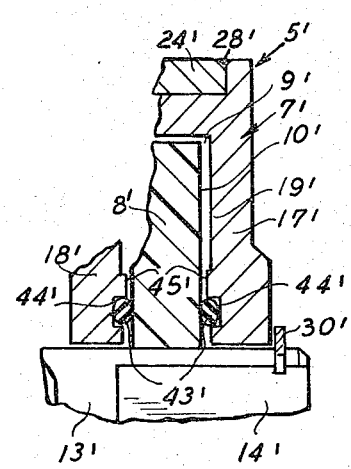
Fig. 4
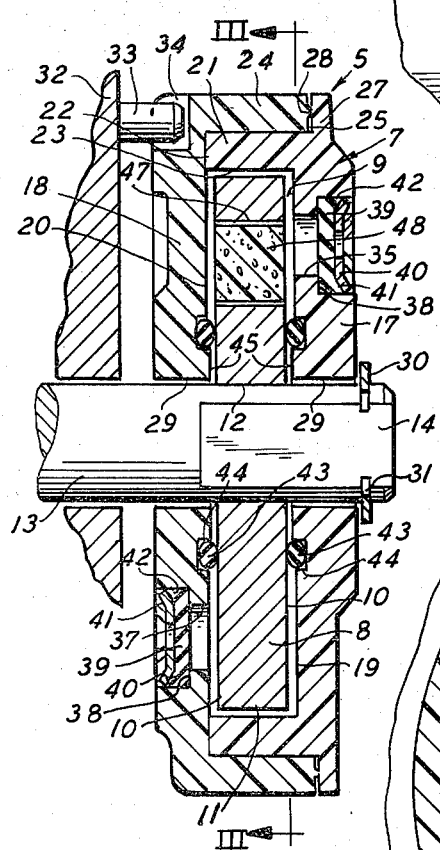
Fig. 2
Fig. 3

VISCOUS DAMPER HAVING RIGID PLASTIC STRUCTURE

This invention relates to viscous dampers functioning on the principle of the resistance to shearing of a film of viscous damping medium in a shear film space between relatively parallely movably surfaces.

Dampers of this kind comprise assemblies in which a member is at least partially within a housing defining a working chamber in which at least one surface of the housed member and a surface of the housing are in parallel shear film spaced relation so that a shear film of viscous fluid damping medium coupling the surfaces will resist relative parallel movement of the surfaces. Heretofore the relatively moveable working surface parts of the damper have customarily been made from metal, and for economy purposes the metal has generally been ferrous comprising cast and/or machined components. Silicone fluid has been found to be the most adaptable viscous medium for these dampers because of its unusual stability within a wide range of temperature conditions. However, a peculiar characteristic of the silicone damping medium fluids has been that in the presence of ferrous surfaces rubbing together the fluid acts as a binder. This phenomenon was recognized and alleviated as disclosed in U.S. Pat. No. 2,824,467 where non-ferrous bearings were mounted on the member within the working chamber to prevent contact of the ferrous working components.

Subsequently, in U.S. Pat. No. 3,121,347 an arrangement was proposed in which all of the components were metal but certain surfaces incompatible in the presence of silicone fluid were proposed to be treated by nickel or copper plating or anodized where the members were made from aluminum or magnesium. Thereafter as represented in U.S. Pat. No. 3,373,633 it was proposed to maintain the working surfaces within the damper positively against direct contact by means of plastic bearings, since the plastic material is compatible with the silicone fluid, that is the bearing surface in contact with ferrous or other metal will utilize the silicone fluid as a lubricant without liability of seizing. It will be noted that characteristic of all of the foregoing examples in prior patents is either the provision of extra parts represented by the bearing structures, generally involving intricate machining to accommodate the bearings or the provision of costly plating. However, in the relatively large crankshaft dampers exemplified those costs are not intolerable.

More recently utilization of the viscous shear damper principle has been applied to relatively small size damper units for use in office machinery which is a rapidly expanding field. More specifically, it has been found that use of such dampers in heavy duty copying machines for controlling return speed of springloaded rolls and which are part of the operating mechanism of the copying machine apparatus. Such dampers having metal rotors and metal housings have been produced in substantial quantities by Houdaille Industries, Inc., the assignee of the present application. Metal components have heretofore been deemed necessary in order to withstand the relatively large torque forces which these dampers must withstand such as up to 150 lbs. per square inch in service. Further, because of the conditions under which the dampers must operate fairly sophisticated bearing arrangements have had to be employed to assure as nearly as practicable freedom from binding contact of metal surfaces in the presence of the silicone damping medium fluid within the dampers. Such bearings have included a nylon bearing ring about the outer perimeter of the rotor of the damper to prevent contact with a housing ring due to any tendency toward radial relative shifting of the housing and rotor, side nylon bearings between the radially outer margins of the working surfaces within the working chamber of the damper, and dry bearing contact between the housing and rotor inboard from O-ring seals and adjacent to the radially inner opening through which the rotor projects into the working chamber in the housing. All such bearings have been deemed necessary in order to maintain the shear film space gaps between the working surface, while avoiding seizing or galling contact (due to presence of the silicone fluid) between the rotor and housing within the working chamber. In addition, the prior damper units just described have required fastener devices for securing the housing parts together. As a result, a large number of separate parts have been required for these prior damper units, amounting to as many as 18 separate parts in the assembly. Minimum weight attained in the described small size (about 2½ inch diameter) metal dampers has been about 9.3 oz.

Another problem with the described small size metal dampers has been in the sealing of the necessary filler openings in the housing. Due to the small size and therefore extremely limited working chamber space large filler openings for injection of the viscous damping fluid have been required. In the prior damper described threaded closures have been employed for the filler openings.

An important object of the present invention is to provide a new and improved viscous damper construction providing substantial improvements over the prior small size damper described.

Another object of the invention is to provide a new and improved viscous damper having rigid plastic structure and thus avoiding any problem of contact seizure in the presence of silicone damping medium fluid even where a portion of the damper is formed from ferrous or other metal material liable to this problem.

A further object of the invention is to provide a new and improved viscous damper having a substantially reduced number of parts as compared with comparable prior dampers and which will attain desired efficiency in a compact, low cost, lightweight units.

The present invention provides in combination in a viscous damper functioning on the principle of the resistance to shearing of a film of viscous damping medium in a shear film space between relatively parallelly movably surfaces, a member having at least one working surface and means for attachment to one of relatively movable parts to be damped; a housing defining a working chamber having an opening and said member extending in working relation through said opening into said chamber; said housing having within said chamber a working surface in shear film spaced relation to said working surface of the member; means for attaching said housing to another of said relatively movable parts, so that when said parts move relatively and cause said surfaces to move in relation parallel relation, the shear film of said viscous damping medium will damp the relative movement of said surfaces and thereby the relative movement of said parts; and at least one of said member and said housing being formed from rigid plastic material so that cooperative damping activity of said member and housing will not suffer from direct contact between surface areas of said member and said housing in the presence of said viscous damping medium, which may be possessed of the proclivity for causing seizure when present between contacting relatively movable surfaces of certain metals.

The invention also provides in combination in a viscous damper functioning on the principle of the resistance to shearing of a film of viscous damping medium in a shear film space between relatively parallelly movably surfaces, a member having at least one working surface and means for attachment to one of relatively movable parts to be damped; a housing defining a working chamber having an opening and said member extending in working relation through said opening into said chamber; said housing having within said chamber a working surface in shear film spaced relation to said working surface of the member; means for attaching said housing to another of said relatively movable parts, so that when said parts move relatively and cause said surfaces to move in relative parallel relation, the shear film will damp the relative movement of said surfaces and thereby the relative movement of said parts; said housing comprising a pair of complementary portions, and one of said portions having thereon said working surface of the housing; resilient seal means between and in engagement with said member and housing for preventing leakage of damping medium through said opening from said working chamber and for substantially maintaining said shear film spaced relation; and a bearing projection on said one housing portion extending from the plane of said housing working surface less than said shear film spacing toward said working surface of said member adjacent to said opening, so that relative displacement of said surfaces toward one another caused by external forces on the damper will be limited by said projection.

The invention further provides in combination in a viscous damper functioning on the principle of the resistance to shearing of a film of viscous damping medium in a shear film space between relatively parallelly movably surfaces, a housing defining a working chamber with a working surface on said housing in said chamber; a member located relatively movably within said working chamber and having a working surface in shear film spaced parallel relation to said housing working surface; means for filling said chamber with viscous damping medium and comprising a filler opening having an outer end and an inner end, said outer end having a recessed outwardly facing shoulder and an annular wall thereabout extending outwardly from said shoulder; and means for closing said opening comprising a sealing disk engaged on said shoulder across said opening, and a sealing disk retainer pressing said disk onto said shoulder and having radial retaining teeth retainingly engaging said wall.

Other objects, features and advantages of the invention will be readily apparent from the following description of certain representative embodiments thereof, taken in conjunction with the accompanying drawing although variations and modifications may be effected without departing from the spirit and scope of the novel concepts embodied in the disclosure and in which:

FIG. 1 is a front elevational view of a damper embodying the invention;

FIG. 2 is a vertical sectional detail view, taken substantially along the line II—II of FIG. 1;

FIG. 3 is a vertical sectional elevational view, taken substantially along the line III—III of FIG. 2; and FIG. 4 is a fragmentary vertical sectional detail view similar to FIG. 2, but showing a modification.

A damper 5 embodying the invention comprises essentially two relatively movable parts, namely a housing 7 and a member 8 assembled with the housing 7 in a working chamber 9 defined by the housing. By preference, the member 8 comprises a disk of circular perimeter and having opposite axially facing working surfaces 10 which, as shown, are flat and parallel. About its perimeter, the mmember 8 has an axially extending and radially outwardly facing annular surface 11. A central opening 12 in the member 8 is adapted to receive therethrough a shaft 13 having diametrically opposite keying flats 14 with which complementary flats 15 in part defining the central opening 12 cooperate to maintain the damper disk member 8 coaxially fixed with respect to the shaft 13.

In a desirable construction, the housing 7 comprises an assembly of complementary generally cup-shaped portions 17 and 18, each of which in part defines the working chamber 9. An axially inwardly facing working surface 19 on the housing member 17 within the working chamber 9 faces the adjacent working surface 10 of the member 8, and a complementary axially inwardly facing working surface 20 on the housing member 18 faces the adjacent working surface 10 of the member 8. Means for maintaining a properly spaced relation of the surfaces 19 and 20 of the housing members also for closing the outer perimeter of the chamber 9 comprise an integral axially extending annular flange 21 on the housing member 17 projecting toward and engaging in fixed stop and housing portion spacing relation at its axially inner end 22 with the member 18. On its radially inner side, the combination closure and stop flange 21 has an annular surface 23 complementary to and located in spaced, substantially concentric relation about the perimeter surface 11 of the member 8. That space is desirably such as to limit any relative radial movement of the member 8 and housing 7 within narrow limits, and is preferably the same or slightly less than the shear film spacing between the working surfaces of the member 8 and the housing 7. At least some damping efficiency may result from the film of viscous damping medium in the annular space defined between the surfaces 11 and 23.

Cooperative with the flange 21 is a complementary axially extending outer perimeter flange 24 on the housing member 18 which telescopically engages about the flange 21, thereby maintaining the housing members 17 and 18 concentrically assembled. By maintaining the joint between the housing member flange 21 in as tight as practicable engagement with the member 18 at the surface 22 and with the housing member flange 24, a substantially sealing joint is provided against migration of viscous damping medium from within the working chamber 9. The joint is permanently sealed against leaking by preferably fusion attachment of axially facing terminal edge 25 of the flange 24 to a radially extending annular attachment flange 27 on the housing member 17. Where, as shown in FIG. 2, the housing members 17 and 18 are formed from rigid plastic material, the edge 25 may be provided with an annular narrow projection 28 ultrasonically welded to the attachment flange 27.

In order to permit relative damping movement of the member 8 and the housing 7, in this instance concentrically about the axis of the shaft 13, the housing members 17 and 18 are provided with respective concentric clearance openings 29 through which the shaft 13 extends in freely relatively rotatable relation. After the damper assembly 7 has been slidably mounted on the shaft 13, means such as a snap ring retainer 30 engaged in a suitable groove 31 adjacent to the outer end of the shaft 13 functions to retain the damper on the shaft between the retainer 30 and a part 32 of apparatus which may be stationary relative to the shaft 13 or which may be torsionally movable relative to the shaft 13. In this instance, for example, the shaft 13 may be part of a spring loaded roll in an office copying machine which is in operation turned in one rotary direction against the bias of a spring and then turned in the opposite direction by the spring bias and relative to the machine part 32 which may be a frame member provided with a fixed stud 33 engaged retainingly within a recess 34 provided for this purpose in the radially outer external portion of the housing member 18 whereby the housing 7 is held substantially stationary, while the shaft 13 and the damper disk member 8 rotate relative to the housing 7.

Before the damper 5 is mounted on the shaft 13, the working chamber 9 is loaded with viscous damping medium, such as silicone which may have a viscosity on the order of twenty thousand centistokes. For this purpose, the housing member 17 has a filter opening 35 of substantial diameter, and the housing 18 has a corresponding filler opening 37, the openings being located substantially diametrically spaced so as to facilitate loading the chamber 9 with the viscous damping medium. In order to facilitate sealing of the openings 35 and 37 after the working chamber 9 has been filled, each of the openings has spaced inwardly from its outer and inner ends an axially outwardly facing annular shoulder 38 upon which is engaged a sealing disk 39 which extends across the opening. A sealing disk retainer 40 desirably comprising a metal ring presses the sealing disk 39 onto the seat provided by the shoulder 38 and radially extending retaining teeth 41 angled radially and axially outwardly retainingly engage an annular wall 42 extending outwardly from and about the shoulder 38. The teeth 41 have bitting edges which are normally at a slightly larger diameter than the diameter of the wall 42 and thus when the retainer ring 40 is pressed into the cavity defined within the wall 42 the teeth 41 are slightly compressed radially inwardly and react radially outwardly to bite firmly into the wall 42, and thus thoroughly retain the sealing disk 39 clamped sealingly against the shoulder 38.

Radially inward leakage from the working chamber 9 is prevented by means of respective annular sealing rings 43 which may be in the form of O-rings adjacent to the inner diameter of the housing members 17 and 18. For this purpose, each of the housing members is provided with a sealing ring groove 44 within which the ring 43 is sealingly engaged and from which the ring projects into sealing engagement with the damper member 8 at the radially inner margins of the working surfaces 10. By having the sealing rings 43 substantially equal, so that under sealing compression they react with equal opposite thrust against the damper member 8, the sealing rings 43 are adapted to serve as centering means acting between the housing 7 and the member 8 considered in the axial direction for maintaining the shear film spaced relation between the working surfaces 10 of the member 8 and the working surfaces 19 and 20 within the housing.

Means are provided for precluding dry running contact of the working surfaces 10 and 19 or 20 due to some unintended but possible axial thrust acting on the housing 7 or the shaft 13 and causing axial relative displacement of the relatively movable portions of the damper and corresponding movement of opposed working surfaces toward one another. In one desirable form, such means comprise a respective annular bearing projection 45 on the housing portions 17 and 18, extending from the plane of the respective working surfaces 19 and 20, less than the shear film spacing between the surfaces 10 and 19 and 20. The bearing projections 45 extend toward the working surfaces 10 of the member 8 adjacent to the radially inner opening from the working chamber 9. As will be observed in FIG. 2, the annular bearing surfaces 45 are located radially inwardly adjacent to the sealing rings 43 and project to an offset relation axially inwardly relative to the working surfaces 19 and 20 of the housing to a limited extent less than the shear film spacing of the surfaces so as to remain spaced from the opposing surfaces of the member 8 event against limited axial thrust forces tending to relatively axially move the relatively removable components of the damper. In the event of relatively strong axial thrust, bottoming out of opposed working surfaces will be prevented by the adjacent bearing projection 45. Since the bearing projection 45 is of only very limited bearing area, only that limited area may run dry for a short interval. Thus, the shear film working surfaces are precluded from contacting one another even though the film of damping fluid therebetween may be squeezed to a mere lubricating film.

In order to permit transfer of damping medium between the shear film spaces, in addition to the annular gap between the radially facing surfaces 11 and 23 within the chamber 9, the inner damper member 8 is desirably provided with a cross port 47. In addition, the port 47 serves as a cavity within which is located a compressible accumulator 48 desirably in the form of a closed cell elastomer block. One purpose of the accumulator 48 is to assure full loading of the working chamber 9 by placing the accumulator under some compression when filling the damper with viscous damping fluid. In addition, the accumulator 48 will compress upon heat expansion of the damping medium and thus avoid excessive internal pressure buildup within the damper.

On reference to FIG. 4 a modification is depicted which in general respects is the same as the structure shown in FIG. 2, except that the housing 7' of the damper 5' is shown as comprising a metal construction of generally cup-shaped portions 17' and 18', and the inner member 8' is shown as comprising a rigid plastic construction and the axial stop bearings 45' are shown as located outboard, i.e. radially outwardly from the sealing rings 43'. An advantage of having the bearings 45' radially outwardly from the sealing rings 43' and thus exposed to the working chamber 9' is that if either of the annular stop spacer bearings 45' is forced into engagement with the damper member 8', there will be a lubricating film of the viscous damping material between the surface of the bearing 45' and the member 8' which will avoid dry running of such surfaces. The purpose of the bearings 45' is functionally the same as described for the bearings 45 in FIG. 2. Permanent, sealed juncture of the housing portions 17' and 18' may be effected by means of welding 28' at the joint between the flanges 21' and 24'. Primed reference numerals in FIG. 4 which have not otherwise been particularly described in relation to FIG. 4, should be understood to represent parts corresponding to similarly numbered elements in FIG. 2, and therefore the description as to those elements applies equally in FIG. 4.

Although in FIG. 2 the damper member 8 acts as a rotor in that it rotates relative to the housing 7 in operation, the reverse may be true, namely, that the member 8 may be held stationary and the housing 7 caused to rotate relative to the member 8 if that is the preferred mode of operation of the apparatus with which the damper 5 is used.

While in FIG. 2 the member 8 is depicted as made from a suitable metal and the housing 7 is shown as made from rigid plastic material, and in FIG. 4, the inner member 8' is shown as made from rigid plastic material and the housing 7' made from suitable metal, both portions of the damper 7' and 8' may be made from rigid plastic material, if preferred. A distinct advantage of having at least one of the portions 7, 7' and 8, 8' made from plastic is that liability of seizure or galling is avoided if the parts rub together in the presence of the silicone damping medium, which has been found to be possessed of the proclivity for causing seizure or galling when present between contacting relatively movable surfaces of certain metals, and in particular ferrous or ferrous containing metals, or aluminum. Heretofore, plating or coating with nickel or copper or anodizing aluminum surfaces has been proposed. In addition to adding a significant cost to the damper, plating or anodizing may wear through under severe operating conditions and thus expose the surfaces to possible seizure or galling. By having at least one of the relatively movable parts of the housing made from rigid plastic material, not only is seizing or galling prevented even though the other of the relatively movable parts is made from metal, but there is no danger of wearing through a protective coating.

Because of the liability to wearing through of plated surfaces, non-metallic or non-seizing metallic bearing means, such as nylon or bronze have been employed in some prior dampers to maintain non-compatible surfaces separated in the presence of viscous damping medium having the proclivity for causing seizure when present between contacting relatively movable surfaces of certain metals. By having at least one of the relatively moving parts of the damper made from plastic material substantial reduction in damper parts is attained, e.g. need for separate bearing elements is eliminated. The plastic components can be precision molded. In addition, significant reduction in weight can be attained by making one or both of the relatively movable portions of the damper from plastic material. This is an especially valuable factor in dampers of the type described herein in which inertia mass is not a requirement but shear film viscous damping is desired for damping movement of relatively movable parts to which the portions of the damper are respectively attached.

It will be understood that variations and modifications may be effected without departing from the spirit and scope of the novel concepts of this invention.

I claim as my invention:

1. A viscous damper, functioning on the principle of the resistance to shearing of a film of viscous damping medium in a shear film space between relatively parallelly movable surfaces, which damper comprises;

(a) a radially extending member having at least one radially extending and axially facing planar working surface and means for attachment of the member to a first of relatively movable parts to be damped;

(b) an annular housing which defines a working chamber having a radially facing opening through which said member extends into said working chamber, said member having within said chamber a radially extending working planar surface facing axially toward a housing planar working surface in said working chamber in shear film spaced relation;

(c) a viscous damping medium in said chamber providing a shear film of the damping medium between said working surfaces;

(d) means for attaching said housing to a second relatively movable part so that, when said first and second parts move relatively with respect to each other and cause said housing and member and thereby said surfaces to move in relative parallel relation, said shear film will damp the relative movement of said surfaces and, thereby, the relative movement of said housing and member and thus the parts to which they are attached;

(e) annular resilient seal means between and in engagement with said member and said housing adjacent to said opening for preventing leakage of said damping medium through said opening from said working chamber, and said seal means functioning for normally maintaining said shear film spaced relation; and (f) a bearing projection on said housing projecting from a plane of said housing working surface, less than said shear film spaced relation, toward said planar working surface of said member and normally remaining spaced from said planar working surface of said member, but functioning upon displacement of said surfaces toward one another, as may be caused by external forces on the damper, to limit movement of said surfaces toward one another to the extent of the projecting of said projection from said plane of said housing working surface.

2. A damper according to claim 1, wherein said member is metallic and said housing is of a rigid plastic material.

3. A damper according to claim 1, wherein said member is of a rigid plastic material and said housing is metallic.

4. A damper according to claim 1, wherein at least one of said member and said housing including said projection is of a rigid plastic material, so that the damping action of said member and said housing will not suffer from direct contact between surface areas of said member and said housing in the presence of the viscous damping medium which may be possessed of the proclivity for causing siezure when present between contacting relatively movable surfaces of certain metals.

5. A damper according to claim 1, including means for filling said working chamber with viscous damping medium and comprising a filler opening into said housing, said opening having an outer end and an inner end portion, said inner end portion having a recessed outwardly facing shoulder and an annular wall thereabout extending outwardly from said shoulder to said outer end, means for closing said opening comprising a sealing disk engaged on said shoulder and across said opening, and a sealing disk retainer pressing said disk onto said shoulder and having generally radially and axially outwardly extending retaining teeth retainingly engaging said wall.

6. A damper according to claim 1, 4 or 5, wherein said annular resilient seal means is located between said bearing projection and said working chamber.

7. A damper according to claim 1, 4 or 5, wherein said bearing projection is located between said working chamber and said annular resilient seal means.

8. A damper according to claim 1, 4 or 5, wherein said member and said housing have axially extending radially spaced surfaces normally providing a clearance space therebetween and comprising part of said shear film spacing in the chamber.

9. A damper according to claim 1, wherein said housing comprises annular portions having axially oppositely extending telescopically engaged annular outer perimeter flanges, one of said telescoped flanges being engaged within the other of said flanges, the housing portion from which said one telescoped flange projects having a radially outwardly extending annular attachment flange toward which a free edge of the other of said telescoped flanges projects, and means securing said attachment flange and said free flange edge fixedly together.

* * * * *